(12) United States Patent
Blanchard

(10) Patent No.: US 8,506,657 B2
(45) Date of Patent: Aug. 13, 2013

(54) COLLOIDAL DISPERSION OF A RARE EARTH COMPOUND COMPRISING AN ANTI-OXIDANT AGENT AND USE THEREOF AS ADDITIVE FOR DIESEL FUEL FOR INTERNAL COMBUSTION ENGINES

(75) Inventor: Gilbert Blanchard, Lagny-le-Sec (FR)

(73) Assignee: Rhodia Operations, Aubervilliers (FR)

( * ) Notice: Subject to any disclaimer, the term of this patent is extended or adjusted under 35 U.S.C. 154(b) by 1631 days.

(21) Appl. No.: 10/551,914

(22) PCT Filed: Apr. 1, 2004

(86) PCT No.: PCT/FR2004/000776
§ 371 (c)(1),
(2), (4) Date: Sep. 30, 2005

(87) PCT Pub. No.: WO2004/089528
PCT Pub. Date: Oct. 21, 2004

(65) Prior Publication Data
US 2006/0196108 A1    Sep. 7, 2006

(30) Foreign Application Priority Data
Apr. 4, 2003   (FR) ..................................... 03 04226

(51) Int. Cl.
*C10L 1/18*   (2006.01)
*C10L 1/22*   (2006.01)

(52) U.S. Cl.
USPC ................................. 44/364; 44/385; 44/426

(58) Field of Classification Search
USPC ............................. 44/602, 354, 364, 385, 426
See application file for complete search history.

(56) References Cited

U.S. PATENT DOCUMENTS

| | | | |
|---|---|---|---|
| 3,205,053 A | 9/1965 | McCord et al. | |
| 3,758,670 A | 9/1973 | McBride et al. | |
| 4,545,923 A | 10/1985 | Gradeff et al. | |
| 4,886,624 A | 12/1989 | Gradeff et al. | |
| 5,880,241 A * | 3/1999 | Brookhart et al. | 526/348 |
| 6,136,048 A | 10/2000 | Birchem et al. | |
| 6,210,451 B1 | 4/2001 | Chopin et al. | |
| 6,271,269 B1 | 8/2001 | Chane-Ching et al. | |
| 6,649,156 B1 | 11/2003 | Chane-Ching | |
| 6,811,723 B1 | 11/2004 | Aupaix et al. | |
| 7,459,484 B2 | 12/2008 | Blanchard et al. | |
| 2003/0187077 A1 | 10/2003 | Chane-Ching | |
| 2004/0109853 A1* | 6/2004 | McDaniel | 424/94.6 |
| 2005/0066571 A1* | 3/2005 | Wakefield | 44/354 |
| 2006/0005465 A1* | 1/2006 | Blanchard et al. | 44/602 |
| 2007/0169406 A1 | 7/2007 | Blanchard et al. | |
| 2009/0241523 A1 | 10/2009 | Harle et al. | |

FOREIGN PATENT DOCUMENTS

| | | |
|---|---|---|
| EP | 0 671 205 A2 | 9/1995 |
| FR | 0308311 A1 * | 3/1989 |
| FR | 2 681 534 | 3/1993 |
| FR | 2 768 155 | 3/1999 |
| JP | 51-122107 | 10/1976 |
| JP | 62-167393 | 7/1987 |
| WO | WO 96/21708 A1 | 7/1996 |
| WO | WO 96/28524 A1 | 9/1996 |
| WO | WO 97/19022 | 5/1997 |
| WO | WO 00/49098 | 8/2000 |
| WO | WO 01/10545 A1 | 2/2001 |
| WO | WO0110545 * | 2/2001 |

* cited by examiner

*Primary Examiner* — James Goloboy
*Assistant Examiner* — Chantel Graham
(74) *Attorney, Agent, or Firm* — Dentons US LLP

(57) ABSTRACT

The invention relates to a dispersion of the type comprising particles of a rare earth compound, particularly a compound of cerium, an acid and an organic phase, characterized in further comprising an anti-oxidant agent which can particularly be selected from substituted derivatives of phenol, aromatic amines or tocopherols. Said dispersion may be used as additive for diesel fuel for internal combustion engines, in particular as additive for diesel for diesel engines.

18 Claims, No Drawings

COLLOIDAL DISPERSION OF A RARE EARTH COMPOUND COMPRISING AN ANTI-OXIDANT AGENT AND USE THEREOF AS ADDITIVE FOR DIESEL FUEL FOR INTERNAL COMBUSTION ENGINES

This application is an application under 35 U.S.C. Section 371 of International Application Number PCT/FR2004/000776 filed on Apr. 1, 2004.

The present invention relates to a colloidal dispersion of a rare earth compound comprising an antioxidant and its use as diesel fuel additive for internal combustion engines.

It is known that during the combustion of diesel fuel in a diesel engine, the carbonaceous products tend to form soot, which is considered to be harmful both to the environment and to health. For many years, techniques have been sought for reducing the emission of these carbonaceous particles.

One satisfactory solution consists in introducing, into the soot, catalysts permitting frequent autoignition of the soot collected in the filter. For this purpose, this soot must have a sufficiently low autoignition temperature to be frequently reached during normal running of the engine.

It is known that dispersions of rare earth compounds, used as additives for motor fuels, can contribute to reducing the autoignition temperature of the soot.

These dispersions must particularly have high stability, meaning that the rare earth compound must remain in suspension in the fuel and not precipitate when the dispersion is contacted with the fuel. In fact, it has been found that this stability could depend on the quality of the diesel fuel, particularly of the additives that may be included in the composition thereof. It is therefore particularly advantageous to have a dispersion that is stable regardless of the grade of diesel fuel used.

It is an object of the invention to supply such a dispersion.

For this purpose, the dispersion of the invention, which is of the type comprising particles of a rare earth compound, an acid and an organic phase, is characterized in that it further comprises an antioxidant.

The presence of an antioxidant has the advantage of making the stability of the dispersion of the invention independent of the diesel fuel in which it is incorporated.

Other features, details and advantages of the invention will appear more completely from a reading of the description that follows, as well as the various concrete but nonlimiting examples provided to illustrate it.

For the rest of the description, rare earth means the elements of the group consisting of yttrium and the elements of the Periodic Table with atomic numbers of 57 to 71 inclusive. The Periodic Table of the Elements referred to is the one published in the Supplément au Bulletin de la Société Chimique de France n° 1 (January 1966).

The colloidal dispersions to which the invention can apply are described in greater detail below.

The expression "colloidal dispersion of a rare earth compound" means any system consisting of fine solid particles with colloidal dimensions based on said compound, in suspension in a liquid phase, said particles further possibly containing residual quantities of bound or adsorbed ions such as, for example, nitrates, acetates, citrates or ammoniums. Colloidal dimensions means dimensions between about 1 nm and about 500 nm. The particles may more particularly have an average size of no more than about 250 nm, particularly no more than 100 nm, preferably no more than 20 nm, and even more preferably no more than 15 nm. The above dimensions are determined by transmission electron microscopy (TEM). It may be noted that in such dispersions the rare earth may be found either completely in the form of colloids, or simultaneously in the form of ions and in the form of colloids.

The rare earth compound is generally an oxide and/or a hydrated oxide (hydroxide).

With respect to the rare earth, this may be more particularly selected from cerium, lanthanum, yttrium, neodymium, gadolinium, and praseodymium. Preferably, the rare earth is selected from cerium, lanthanum, yttrium and praseodymium.

It may be noted that the colloidal dispersions according to the invention may comprise a compound that may be based on two or more rare earths.

In the case of a compound based on at least two rare earths, said rare earths may have different degrees of oxidation. The oxidation degree of the rare earths is generally equal to 3 or 4.

In the particular case in which the rare earth is cerium, it is mainly in the form of cerium IV. For example, the cerium III content with respect to cerium IV (content expressed by the atomic ratio Ce III/total Ce) is generally no more than 40%. It may vary according to the embodiments of the dispersions used and thus be no more than 5%, more particularly no more than 1%, and even more particularly no more than 0.5%.

According to a particular embodiment of the invention, the colloidal dispersions may also comprise at least one other element (E) selected from the groups IIA, 1VA, VIIA, VIII, IB, IIB, IIIB and IVB of the Periodic Table of the Elements.

In this respect, one can mention more particularly iron, copper, strontium, zirconium, titanium, gallium, palladium and manganese.

With respect to the respective proportions of the elements entering into the composition of the compound(s) mentioned previously, in the case of the presence of at least one rare earth with at least one element (E), the proportion of rare earth(s) is preferably at least 10%, more particularly at least 20%, and even more particularly at least 50%, in moles with respect to the total number of moles of rare earth element(s) and of (E) expressed as oxide.

Besides the particles mentioned above, the colloidal dispersion according to the invention comprises at least one acid, advantageously amphiphilic. The acid is more particularly selected from those comprising at least 6 carbon atoms, even more particularly from 10 to 60 carbon atoms, preferably from 15 to 25 carbon atoms.

These acids may be linear or branched. They may be arylic, aliphatic or arylaliphatic acids, possibly having other functions provided that these functions are stable in the media in which the dispersions according to the present invention are to be used. Thus, for example, use can be made of aliphatic carboxylic acids, aliphatic sulfonic acids, aliphatic phosphonic acids, alkylarylsulfonic acids and alkylarylphosphonic acids having about 10 to about 40 carbon atoms, whether natural or synthetic. It is obviously possible to use mixtures of acids.

Use can also be made of carboxylic acids of, which the carbon chain has ketone functions, such as pyruvic acids substituted at alpha of the ketone function. This may also include alpha-halogenocarboxylic acids or alpha-hydroxycarboxylic acids. The chain attached to the carboxylic group may have unsaturations. However, the general tendency is to avoid too many double bonds because cerium catalyzes the crosslinking of the double bonds. The chain may be interrupted by ether or ester functions, provided that the lipophilicity of the chain with the carboxylic group is not excessively altered.

As an example, mention may be made of the fatty acids of tallol, soybean oil, tallow, linseed oil, oleic acid, linoleic acid, stearic acid and isomers thereof, pelargonic acid, capric acid, lauric acid, myristic acid, dodecylbenzenesulfonic acid, ethyl-2-hexanoic acid, naphthenic acid, hexoic acid, toluenesulfonic acid, toluenephosphonic acid, laurylsulfonic acid, laurylphosphonic acid, palmitylsulfonic acid, and palmitylphosphonic acid.

In connection with the present invention, the term "amphiphilic acid" may also designate other amphiphilic agents such as, for example, polyoxyethylene phosphate alkyl ethers. This applies to phosphates with the formula:

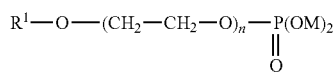

or dialkyl polyoxyethylene phosphates with the formula:

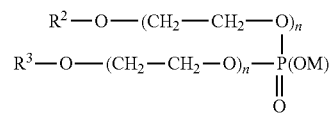

in which:
- $R^1$, $R^2$, $R^3$, identical or different, represent a linear or branched alkyl radical, particularly with 2 to 20 carbon atoms; a phenyl radical; an alkylaryl radical, more particularly an alkyl phenyl radical, particularly with one alkyl chain with 8 to 12 carbon atoms; an arylalkyl radical, more particularly a phenylaryl radical;
- n is the number of ethylene oxide, that may be between 0 and 12, for example;
- M represents an atom of hydrogen, sodium or potassium.

The radical $R^1$ may be in particular a hexyl, octyl, decyl, dodecyl, oleyl, or nonylphenyl radical.

Examples of this type of amphiphilic compound that may be mentioned include those marketed with the trade names Lubrosphos® and Rhodafac® sold by Rhodia and particularly the following products:

Rhodafac® RA 600 polyoxyethylene ($C_8$-$C_{10}$) alkyl phosphate ethers

Rhodafac® RS 710 or RS 410 polyoxyethylene tridecyl phosphate ether

Rhodafac® PA 35 polyoxyethylene oleocetyl phosphate ether

Rhodafac® PA 17 polyoxyethylene nonylphenyl phosphate ether

Rhodafac® RE 610 polyoxyethylene nonyl(branched) phosphate ether.

The dispersions of the invention further comprise a liquid phase that is an organic phase and in which the particles are in suspension.

Examples of the organic phase that may be mentioned include aliphatic hydrocarbons such as hexane, heptane, octane, nonane, inert cycloaliphatic hydrocarbons such as cyclohexane, cyclopentane, cycloheptane, aromatic hydrocarbons such as benzene, toluene, ethylbenzene, xylenes, liquid naphthenes. Also suitable are petroleum cuts of the Isopar or Solvesso type (trademarks of EXXON), particularly Solvesso 100 which essentially contains a mixture of methylethyl- and trimethylbenzene, Solvesso 150 which contains a mixture of alkylbenzenes, particularly of dimethylbenzene and tetramethylbenzene, and Isopar, which essentially contains $C_{11}$ and $C_{12}$ isoparaffinic and cycloparaffinic hydrocarbons. Mention may also be made, among other petroleum cuts, of those of the Petrolink® type produced by Petrolink or of the Isane® type produced by Total.

Also usable as the organic phase are chlorinated hydrocarbons such as chloro- or dichlorobenzene, and chlorotoluene. Ethers and aliphatic and cycloaliphatic ketones, such as, for example, diisopropyl ether, dibutyl ether, methyl ethyl ketone, methyl isobutyl ketone, diisobutyl ketone, mesityl oxide, may be considered.

Esters may be considered, but they have the drawback of the risk of being hydrolyzed. Ethers suitable for use which may be mentioned include those produced by the reaction of acids with $C_1$ to $C_8$ alcohols and particularly palmitates of secondary alcohols such as isopropanol. An example that may be mentioned is butyl acetate.

Obviously, the organic phase may be based on a mixture of two or more hydrocarbons or compounds of the type described above.

The dispersions according to the invention have a concentration of rare earth compound(s) and, if applicable, of element E, which can generally be up to 40% by weight of rare earth oxide(s) and of element E oxide with respect to the total weight of the dispersion. Above 40%, the viscosity of the dispersion is liable to be too high, particularly at low temperature. However, it is preferable for this concentration to be at least 5%. Lower concentrations are economically less advantageous because of the volume of liquid phase, which becomes too high.

The proportion between the organic phase and the acid or acids is not critical. The weight ratio between the organic phase and the acid or acids is preferably chosen to be between 0.3 and 2.0.

The dispersions of the invention may also occur according to various specific embodiments.

Thus, according to a first embodiment, the dispersion is such that at least 90% of the particles are single-crystal particles. "Single-crystal" particles means particles which appear to be individualized and consist of a single crystallite when the dispersion is examined by TEM (high-resolution transmission electron microscopy).

The cryo-TEM technique can also be used to determine the state of aggregation of the elementary particles. In this technique, transmission electron microscopy (TEM) is used to observe samples that are kept frozen in their natural medium, which is either water or organic diluents such as aromatic or aliphatic solvents, for example Solvesso and Isopar, or certain alcohols such as ethanol.

The freezing is carried out on thin films 50 to 100 nm thick, either in liquid ethane for the aqueous samples, or in liquid nitrogen for the others.

By cryo-TEM, the state of dispersion of the particles is well preserved and representative of the state present in the natural medium.

According to this embodiment, the particles have a fine and narrow particle size distribution. In fact, they have a $d_{50}$ of between 1 and 5 nm, preferably between 2 and 3 nm.

In the present description, the particle size distribution characteristics refer to notations of the $d_n$ type where n is a number from 1 to 99. This notation represents the size of the particles such that n % is the number of said particles having a size smaller than or equal to said size. For example, a $d_{50}$ of 3 nanometers means that 50% by number of the particles are smaller than or equal to 3 nanometers in size.

The particle size distribution is determined by transmission electron microscopy (TEM), conventionally, on a sample previously dried on a carbon membrane supported on a copper grid.

This preparation technique is preferred because it allows better accuracy in measuring the particle size. The zones selected for the measurements are those that display a state of dispersion similar to that observed in cryo-TEM.

The dispersions according to the embodiment just described are described more particularly in EP-A-1210172, to the teaching of which reference can be made.

The dispersions of the invention may also occur according to a second more particular embodiment in which the particles are not larger than 200 nm, these dispersions also having at least one of the following characteristics:

(i) said particles are in the form of aggregates of crystallites of which the $d_{80}$, advantageously the $d_{90}$, is not more than 5 nanometers, 90% (by weight) of the aggregates comprising 1 to 5, preferably 1 to 3 crystallites;

(ii) the acid is an amphiphilic acid comprising at least one acid with 11 to 50 carbon atoms, having at least one alpha-, beta-, gamma- or delta-branch of the atom bearing the acidic hydrogen.

For the dispersions satisfying the characteristic (ii) above, the particle sizes may be less specific or different to those given for the dispersions satisfying the characteristic (i). Thus, the $d_{80}$, advantageously the $d_{90}$, of the particles consisting of aggregates of crystallites, may be no more than 10 nanometers and more particularly no more than 8 nanometers. The crystallites forming the aggregates and hence the particles have a size of no more than 5 nanometers. However, the dispersions satisfying the characteristic (ii) may possibly also have characteristics relative to the composition and size of the particles that have been mentioned previously in the case (i).

For the two cases considered and according to another variant, 80% (by weight) of the aggregates comprise 3 to 4 crystallites.

With respect more precisely to the amphiphilic acid of the characteristic (ii), this is a more specific amphiphilic acid system based on one or more acids answering to the characteristic (ii). The preferred range is from 15 to 25 carbon atoms for the acids of said amphiphilic system. To obtain better results, especially when the chain length is short (less than 14 carbon atoms), in the case of a single branch and especially if it is located in the gamma or delta position of the atom bearing the acidic hydrogen, it is highly desirable for this branch to have at least two carbon atoms, and advantageously three.

It is preferable for the longest linear portion to have at least 6, and preferably 8 carbons.

It is advantageous for the pKa of at least one of the acids to be no more than 5, preferably no more than 4.5.

It is also advantageous for the side chain(s) of the branched acids to comprise at least two carbon atoms, and preferably three carbon atoms.

Particularly advantageous acids that may be mentioned include the acids consisting of the mixture of acids known by the name of isostearic acid.

The quantity of amphiphilic acid used expressed as the number of moles of acid per mole of rare earth oxide may vary within wide limits, for example between 1/10 and 1 mol per mole of rare earth oxide. The upper bound is not critical, but it is unnecessary to use more acid. Preferably, the amphiphilic acid is used at the rate of 1/5 to 4/5 mol per mole of rare earth oxide. This molar ratio is calculated here by taking, as a mole of amphiphilic acid, the number of moles multiplied by number n of useful acidic functions. More precisely, the number of acid equivalents represents the number of molecules of acid when the acid used is monofunctional, and this number must be doubled or tripled in the case of diacids or triacids and, more generally, multiplied by the number of acidic functions in the case of a polyacid.

In this embodiment, as in the general case, the proportion between the organic phase and the amphiphilic acid or acids is not critical. The weight ratio between the organic phase and the amphiphilic acid or acids is preferably selected between 0.3 and 2.0.

The dispersions according to this second embodiment are described more particularly in EP-A-671205, of which the teaching can also be referred to.

Finally, according to a third embodiment, the dispersions may comprise particles of a rare earth compound that have been obtained by a method comprising the following steps:

a) a solution is prepared comprising at least one soluble salt, preferably a rare earth acetate and/or chloride;
b) the solution is contacted with a basic medium and the reaction mixture thus formed is maintained at a basic pH;
c) the precipitate formed is recovered by spraying or freeze-drying.

The dispersions according to this third embodiment are described more particularly in EP-A-862537, the teaching of which can also be referred to.

According to the essential feature of the dispersion of the invention, it contains an antioxidant. This means an agent that is capable of preventing the oxidation of organic compounds in particular, this oxidation possibly occurring for example by attack of the double or triple bonds, the conjugate double bonds or the alcohol functions.

The antioxidant may be selected first from substituted derivatives of phenol, these derivatives possibly being of the monophenol or polyphenol type or of the hydroquinone type.

In case of derivatives of the monophenol type, these are for example products of the alkyl- or alkoxyphenol type with the formula (R')(R)(R)φ (OH), in which R and R' are alkyl or alkoxyl radicals such as tert-butyl, methyl or the methoxy radical and φ is the benzene ring.

Nonlimiting examples that may be mentioned include 2,6-di(tert-butyl)phenol, 2,6-di-tert-butyl paracresol, (or 2,6-di-tert-butyl-1-methylphenol), or 2-tert-butyl-4-methoxyphenol. Mention may also be made of octadecyl 3,5-di-t-butyl-4-hydroxyhydrocinnamate.

For derivatives of the polyphenol type, mention may primarily be made of bisphenols, for example 2,2-methylenebis (6-t-butyl-p-cresol), 4,4'-butylidenebis(6-t-butyl-m-cresol).

The polyphenols may answer in particular to the formula $(R)(OH)(CH_3)\phi$-R'-$\phi(R)(OH)(CH_3)$ in which R is an alkyl radical such as tert-butyl, R' is a radical of the $(CH_2)_n$ type such as methylene and φ is the benzene ring. Mention may also be made of the butylated product of the reaction of p-cresol with dicyclopentadiene.

With respect to hydroquinones, examples include 2,5-di-t-amylhydroquinone and t-butylhydroquinone.

The antioxidant may also be selected from aromatic amines.

Particularly worth mentioning are p-phenylenediamines with the formula RHN-φ-NR'H in which R is an alkyl radical such as 1,3-dimethylbutyl and R' is a phenyl radical. More particularly there may be mentioned N-phenyl-N'(1,3-dimethylbutyl)-p-phenylenediamine, N-phenyl-N'-isopropyl-p-phenylenediamine, N,N'-diphenyl-p-phenylenediamine, N,N'-di-sec-butyl-p-phenylenediamine and the diaryl(phenyl/tolyl)-p-phenylenediamine mixture.

As other antioxidant amines, use can also be made of trimethyldihydroquinolines such as 6-ethoxy-2,2,4-trimethyl-1,2-dihydroquinoline or 2,2,4-trimethyl-1,2-dihydroquinoline in polymerized form.

Mention may also be made of alkylated diphenylamines with the formula Rϕ-NH-ϕR in which R is an alkyl radical, for example octyl. Examples of these products include octyldiphenylamine and nonyldiphenylamine.

Also suitable are the condensation products of amines and acetone and of amines and aldehydes, such as the condensation product of diphenylamine and acetone.

Finally, mention may also be made of amines like p-anilinophenol and 4,4-di-sec-butylaminodiphenylmethane.

Finally, use can also be made of tocopherols as antioxidants.

Obviously, it is possible to use various antioxidants in combination, particularly a combination of an agent of each of the two families given above.

The dispersions of the invention can be obtained by the addition of the antioxidant to initial dispersions like those described above. The quantity of agent, expressed by the atomic ratio of antioxidant/(rare earth+element E) may be between 0.5 and 5, more particularly between 0.2 and 3, and even more particularly between 0.5 and 2.

The organic colloidal dispersions just described can be employed as fuel additive for internal combustion engines, more particularly as additive for diesel fuels for diesel engines.

Finally, the invention relates to a fuel for internal combustion engines that contains a colloidal dispersion like the one described above. This fuel is obtained by mixing with the dispersion of the invention.

As stated above, the use of the dispersion of the invention in the fuel enhances the stability of the particles of the rare earth compound in the fuel, particularly diesel fuel, that is, the particles remain in suspension in the fuel without the formation of a significant quantity of a precipitate. Moreover, the dispersion always has the advantage of reducing the soot autoignition temperature.

Examples will now be provided.

In these examples, the colloidal dispersion used is an organic dispersion (Isopar) of cerium and iron prepared according to example 3 of WO 01/10545 with a Ce/Fe atomic ratio of 1, a cerium (metal) and iron (metal) concentration of 6.5% and comprising, as antioxidant, 2,6-di-tert-butyl-4-methylphenol.

The dispersion, containing or not containing the antioxidant, is then mixed with a diesel fuel, and this mixture is aged at various temperatures. On completion of aging, the mixture is filtered and the cerium content of the liquid is measured by the inductively coupled plasma-atomic emission spectrometry (ICP-AES) technique. The apparatus used is an Ultima instrument made by Jobin and Yvon.

EXAMPLE 1

This example applies to a "clear" diesel fuel sold in Sweden and comprising an OLI 9950 lubrication additive made by Octel. This diesel fuel has the following properties:
Sulfur content: 2 ppm
Initial distillation point: 180° C.
Final distillation point: 285° C.
Density: 814 kg/m$^3$
Cetane number: 54
% by volume of aromatics: 4%

The quantities of diesel fuel and dispersion are such that the initial cerium content of the mixture formed is 7 ppm. The antioxidant contents are those measured in the diesel fuel/dispersion mixture.

Table 1 below gives the results obtained.

TABLE 1

| Aging time/ temperature | Without antioxidant | With 20 ppm antioxidant | With 50 ppm antioxidant |
| --- | --- | --- | --- |
| 12 h/80° C. | 4.7 | 6.9 | 6.2 |
| 3 h/90° C. | 2.7 | 6.9 | 6.4 |
| 3 h/120° C. | 2.0 | 7.0 | 6.8 |

It may be observed that in the absence of antioxidant, a large quantity of cerium is no longer found in the liquid phase, indicating that the cerium has largely precipitated during aging. When the antioxidant is present, on the contrary, all or nearly all the initial cerium is found, indicating that it has remained in the state of a colloidal dispersion.

EXAMPLES 2 TO 8

These examples apply to a "clear" diesel fuel marketed in Germany and comprising various lubricants.

This diesel fuel has the following properties:
Sulfur content: 40 ppm
Initial distillation point: 180° C.
Final distillation point: 360° C.
Density: 840 kg/m$^3$
Cetane number: 51
% by volume of aromatics: 20%

The respective cerium and antioxidant contents of the diesel fuel/dispersion mixture formed are respectively 7 ppm and 10 ppm.

Table 2 below gives the results obtained. The values given in the "comparative" lines correspond to the case in which the dispersion contains no antioxidant.

TABLE 2

| | Example | | | | | | |
| --- | --- | --- | --- | --- | --- | --- | --- |
| | 2 | 3 | 4 | 5 | 6 | 7 | 8 |
| Quantity of lubricant (ppm) | 320 | 200 | 200 | 290 | 110 | 300 | 200 |
| Aging time/ temperature | | | | | | | |
| 12 h/80° C. | 0.7 | 4.9 | 4.9 | 0 | 3.7 | 3.4 | 0 |
| Comparative | 6.6 | 6.2 | 7.9 | 6.2 | 6.3 | 7 | 6.2 |
| Invention | | | | | | | |
| 3 h/90° C. | 0 | 5.75 | 0 | 0 | 0 | 0 | 0 |
| Comparative | 7 | 6.7 | 6.1 | 6.4 | 7.4 | 6.3 | 6.3 |
| Invention | | | | | | | |
| 3 h/110° C. | 0 | 0 | 0 | 0 | 0 | 0 | 0 |
| Comparative | 7.0 | 6.8 | 6.0 | 6.5 | 6.2 | 6.7 | 5.0 |
| Invention | | | | | | | |

Type of lubricant used:
Example 2: PC 32
Example 3: R 655
Example 4: R 639
Example 5: R 650
Example 6: Hitec 4848 A
Example 7: Hitec 4140 A
Example 8: Kerokor LA 99

Here also, it may be observed that when the antioxidant is present, most of the initial cerium is always found in the state of a colloidal dispersion, which is not the case in the absence of antioxidant.

The invention claimed is:
1. A colloidal dispersion comprising particles of a rare earth compound, an acid, an organic phase, an antioxidant, and an element E; wherein at least 90% by weight of the particles are monocrystalline, wherein the rare earth compound is cerium and the element E is iron.

2. The dispersion as claimed in claim 1, wherein the antioxidant is selected from the group consisting of a substituted derivative of phenol, an aromatic amine and a tocopherol.

3. The dispersion as claimed in claim 2, wherein the antioxidant is an alkyl- or alkoxyphenol.

4. The dispersion as claimed in claim 3, wherein the antioxidant is 2,6-di-tert-butylphenol, 2,6-di-tert-butyl paracresol, or 2-tert-butyl-4-methoxyphenol.

5. The dispersion as claimed in claim 1, wherein the acid is an amphiphilic acid.

6. The dispersion as claimed in claim 1, wherein the particles have a $d_{50}$ of between 1 and 5 nm.

7. A colloidal dispersion comprising particles of a rare earth compound, an acid, an organic phase, an antioxidant, and an element E, wherein the particles are not larger than 200 nm, said dispersion having the following characteristics:
said particles are in the form of aggregates of crystallites whose $d_{80}$, advantageously $d_{90}$, is not more than 5 nanometers, 90% (by weight) or more of the aggregates comprising 1 to 5 crystallites; and the acid is an amphiphilic acid comprising at least one acid with 11 to 50 carbon atoms, having at least one alpha, beta, gamma, or delta branch of the atom bearing the acidic hydrogen, wherein the rare earth compound is cerium and the element E is iron.

8. The dispersion as claimed in claim 1, wherein the particles of a rare earth compound that have been obtained by a method comprising the following steps:
a) a solution is prepared comprising at least one soluble salt, optionally a rare earth acetate or chloride;
b) the solution is contacted with a basic medium forming a reaction mixture maintained at a basic pH to form a precipitate; and
c) the precipitate formed is recovered by spraying or freeze-drying.

9. The dispersion as claimed in claim 1, wherein the acid is a fatty acid of tallol, soybean oil, tallow, linseed oil, oleic acid, linoleic acid, stearic acid, an isomer thereof, pelargonic acid, capric acid, lauric acid, myristic acid, dodecylbenzenesulfonic acid, ethyl-2-hexanoic acid, naphthenic acid, hexoic acid, toluenesulfonic acid, toluenephosphonic acid, laurylsulfonic acid, laurylphosphonic acid, palmitylsulfonic acid, or palmitylphosphonic acid.

10. A fuel for internal combustion engines with enhanced stability of the particles of the rare earth compound comprising a colloidal dispersion as defined in claim 1, as an additive.

11. A process for making a fuel for an internal combustion engine, comprising the step of mixing a colloidal dispersion as defined in claim 1 with a conventional fuel.

12. A fuel additive in the form of a colloidal dispersion, the colloidal dispersion comprising particles of a rare earth compound, an acid, an organic phase, an antioxidant, and an element E, wherein an atomic ratio of antioxidant to rare earth compound and the element E is 0.2 to 5.0 and wherein the rare earth compound is cerium and the element E is iron.

13. The additive of claim 12, wherein the atomic ratio is 0.2 to 3.0.

14. The additive of claim 13, wherein the atomic ratio is 0.5 to 2.0.

15. The additive of claim 12, comprising up to 90% by weight of the rare earth oxide and element E, with respect to the total weight of the dispersion.

16. The dispersion of claim 1, wherein a weight ratio between the organic phase and acid is 0.3-2.0.

17. A method comprising:
(a) providing a colloidal dispersion comprising particles of a rare earth compound, an acid, an organic phase, an antioxidant, and an element E, wherein at least 90% by weight of the particles of the rare earth compound are monocrystalline; and
(b) combining the colloidal dispersion with a fuel for an internal combustion engine, thereby achieving enhanced stability of the particles of the rare earth compound in the fuel,
wherein the rare earth compound is cerium and the element E is iron.

18. A method comprising:
(a) providing a colloidal dispersion comprising particles of a rare earth compound, an acid, an organic phase, an antioxidant, and an element E, wherein the particles of the rare earth compound are not larger than 200 nm and are in the form of aggregates of crystallites whose $d_{80}$, advantageously $d_{90}$, is not more than 5 nanometers, 90% (by weight) or more of the aggregates comprising 1 to 5 crystallites, and the acid is an amphiphilic acid comprising at least one acid with 11 to 50 carbon atoms, having at least one alpha, beta, gamma, or delta branch of the atom bearing the acidic hydrogen; and
(b) combining the colloidal dispersion with a fuel for an internal combustion engine, thereby achieving enhanced stability of the particles of the rare earth compound in the fuel,
wherein the rare earth compound is cerium and the element E is iron.

\* \* \* \* \*